United States Patent
Chen et al.

(10) Patent No.: US 7,242,422 B2
(45) Date of Patent: Jul. 10, 2007

(54) CIRCUIT AND METHOD FOR DECODING COLOR CODE OF A 3D DISPLAY

(75) Inventors: Chung-Yao Chen, Chang-Hua County (TW); Thomas Lee, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 263 days.

(21) Appl. No.: 11/006,197

(22) Filed: Dec. 6, 2004

(65) Prior Publication Data

US 2005/0099428 A1    May 12, 2005

Related U.S. Application Data

(63) Continuation of application No. 09/874,155, filed on Jun. 5, 2001, now Pat. No. 6,885,379.

(30) Foreign Application Priority Data

May 9, 2001    (TW) .............................. 90111023 A

(51) Int. Cl.
*H04N 13/00* (2006.01)
*H04N 15/00* (2006.01)

(52) U.S. Cl. ......................... 348/43; 348/44; 348/51; 345/589

(58) Field of Classification Search ..................... None
See application file for complete search history.

(56) References Cited

U.S. PATENT DOCUMENTS 5,319,446 A * 6/1994 Emmoto et al. ............. 348/181
5,821,989 A * 10/1998 Lazzaro et al. ................ 348/56

* cited by examiner

*Primary Examiner*—Mark Zimmerman
*Assistant Examiner*—Kevin Xu
(74) *Attorney, Agent, or Firm*—J.C. Patents

(57) ABSTRACT

A circuit and a method for decoding a color code of a 3D display. The color code decoding circuit is built into an on-screen display of a circuit in a display. The color code decoding circuit has several comparators, several recording buffers, a register, a first counter and a second counter. The comparators read a 3D image signal and compare this 3D image signal with a reference signal to obtain a color code value by decoding. The color code value is then recorded in the recording buffer.

2 Claims, 7 Drawing Sheets

CIRCUIT AND METHOD FOR DECODING COLOR CODE OF A 3D DISPLAY

CROSS-REFERENCE TO RELATED APPLICATION

This application is a continuation application of a prior application Ser. No. 09/874,155, filed Jun. 5, 2001 now U.S. Pat. No. 6,885,379. The prior application Ser. No. 09/874,155 claims the priority benefit of Taiwan application serial no. 90111023, filed on May 9, 2001.

BACKGROUND OF THE INVENTION

1. Field of the Invention

The invention relates in general to a circuit and a method for decoding color codes of a 3D video signal. More particularly, the invention relates to a method and a circuit built into an on screen display unit in a display to decode a 3D video signal into a color code.

2. Description of the Related Art

One of the objectives of developing technology is to improve living quality. As technology continuously progresses, living quality is constantly enhanced. For example, in audio video systems, the planar (2D) image has now advanced to a 3D (stereo) image with a bodily experience.

FIG. 1 shows a schematic drawing of a 3D color code. In FIG. 1, a vertical synchronous signal with first 64 lines of horizontal synchronous signals of a 3D image is shown. The color code signal is a signal to distinguish a 3D image format in a 3D stereo video system (not shown). The signal is normally hidden in a video graphics adapter (VGA) signal. By mapping the red (R) signal, green (G) signal and blue (B) signal, the color code hidden in the video signal can be detected. The display then processes properly according to the image format.

FIG. 2 shows a schematic drawing of a 3D video system. In FIG. 2, the conventional decoding method of a 3D video color code is to output a 3D video signal in a video signal from a VGA card 204 of a computer 202. Via a cable 206, the 3D video signal is then sent to a signal processing box 208 with a 3D video color code decoding and signal processing circuit. The 3D video color decoded circuit in the signal processing box 208 detects the color code signal and determines the type of the 3D video signal (the currently used 3D video signal format includes Sync Double, Line Blinking, Page Flipping and Interleave) for proper video signal process.

After being decoded and processed by the signal processing box 208, the 3D video signal is sent to the display 210 to display a 3D video image. The wireless eradiation device 212 transmits the 3D synchronous signal in a form of an electric wave to a pair of 3D glasses. The observer can thus have a 3D vision by alternately blocking one eye.

FIG. 3 is a block diagram showing a conventional 3D video color code decoded and signal processed circuit. In FIG. 3, the comparator 302 compares the level of R signal of the RGB signal output from a VGA card. The comparison result is output to a micro-controller 310 as color code decoding data. Similarly, the comparators 304 and 306 compare the levels of G and B signals of the RGB signal, respectively, as color code decoding data, which are then output to the micro-controller 310.

The horizontal and vertical synchronous signals output from the VGA card are used for circuit synchronization of the micro-controller 310 and the display (not shown). The micro-controller 310 generates a 3D synchronous signal, which is then sent to a pair of 3D glasses, according to the horizontal and vertical synchronous signals. The blocking speed of the 3D glasses is thus synchronous to the 3D video image shown by the display. The micro-controller 310 further comprises a function of processing signal. When the micro-controller 310 receives the color code decoding data from the comparators 302, 304 and 306, the type of the 3D video signal is determined according to the built-in 3D video signal format data. A proper image signal process is then performed.

Accordingly, the conventional color code decoding system is of a 3D display is installed in an external signal processing box. The signal processing box is connected to the VGA card of computer via a cable. The color code decoding system of the 3D display receives an image signal output from the VGA card. Thus, a decoding device (typically a micro-controller) is required between the computer and the display to decode the 3D video signal. This is very inconvenient and not economic at all.

SUMMARY OF THE INVENTION

The invention provides a color code decoding circuit and method in a 3D display. The color code decoding system is built into the 3D display without using additional cable and device such as a micro-controller. Space is thus saved, and the performance of the 3D display is enhanced.

The color code decoded circuit of a 3D display provided by the invention is built into an on-screen display of the display circuit. The color code decoded circuit comprises several comparators, several record buffers, a register, a first counter and a second counter. According to a sample signal, the comparators perform comparisons on a reference signal and a 3D video signal to obtain several decoded color code values. The record buffers are used to record the color code values. The register temporarily stores a readable flag that indicates whether a decoding process is performed on the 3D video signal. The first counter counts the number of the vertical synchronous signal of the 3D video signal. While each vertical synchronous signal is counted, the first counter resets the readable flag. The second counter counts the number of the horizontal synchronous signal of the 3D video signal. When the number of the horizontal synchronous signal reaches a predetermined value, the second counter configures the readable flag.

The invention provides a method of decoding color codes of a 3D display. A 3D image signal is read. The 3D image signal is compared to a reference signal to obtain a color code value. The color code value is recorded in the record buffer.

Both the foregoing general description and the following detailed description are exemplary and explanatory only and are not restrictive of the invention, as claimed.

DESCRIPTION OF THE PREFERRED EMBODIMENTS

Figure 1:
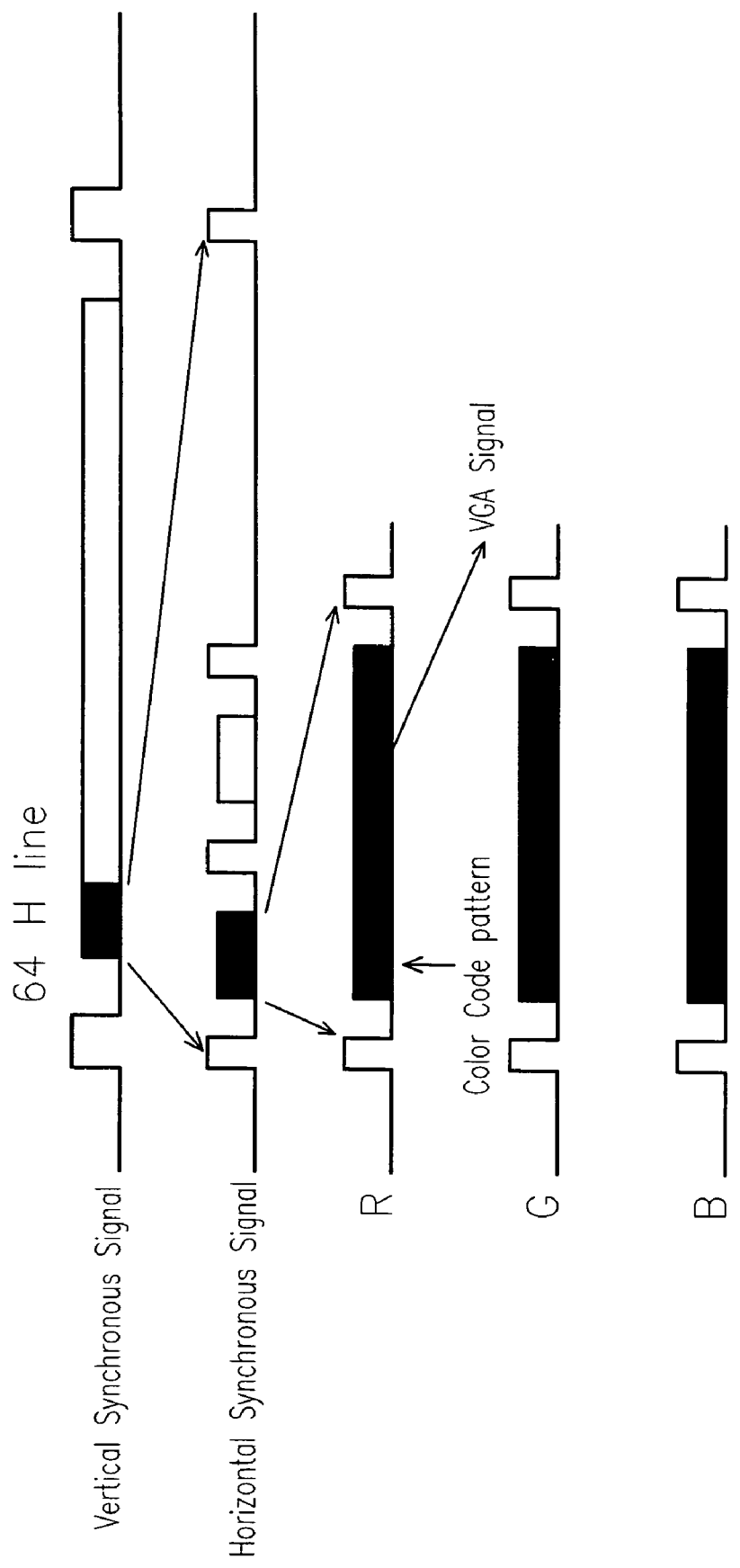
FIG. 1 is a schematic drawing of a conventional 3D color code.
Figure 2:
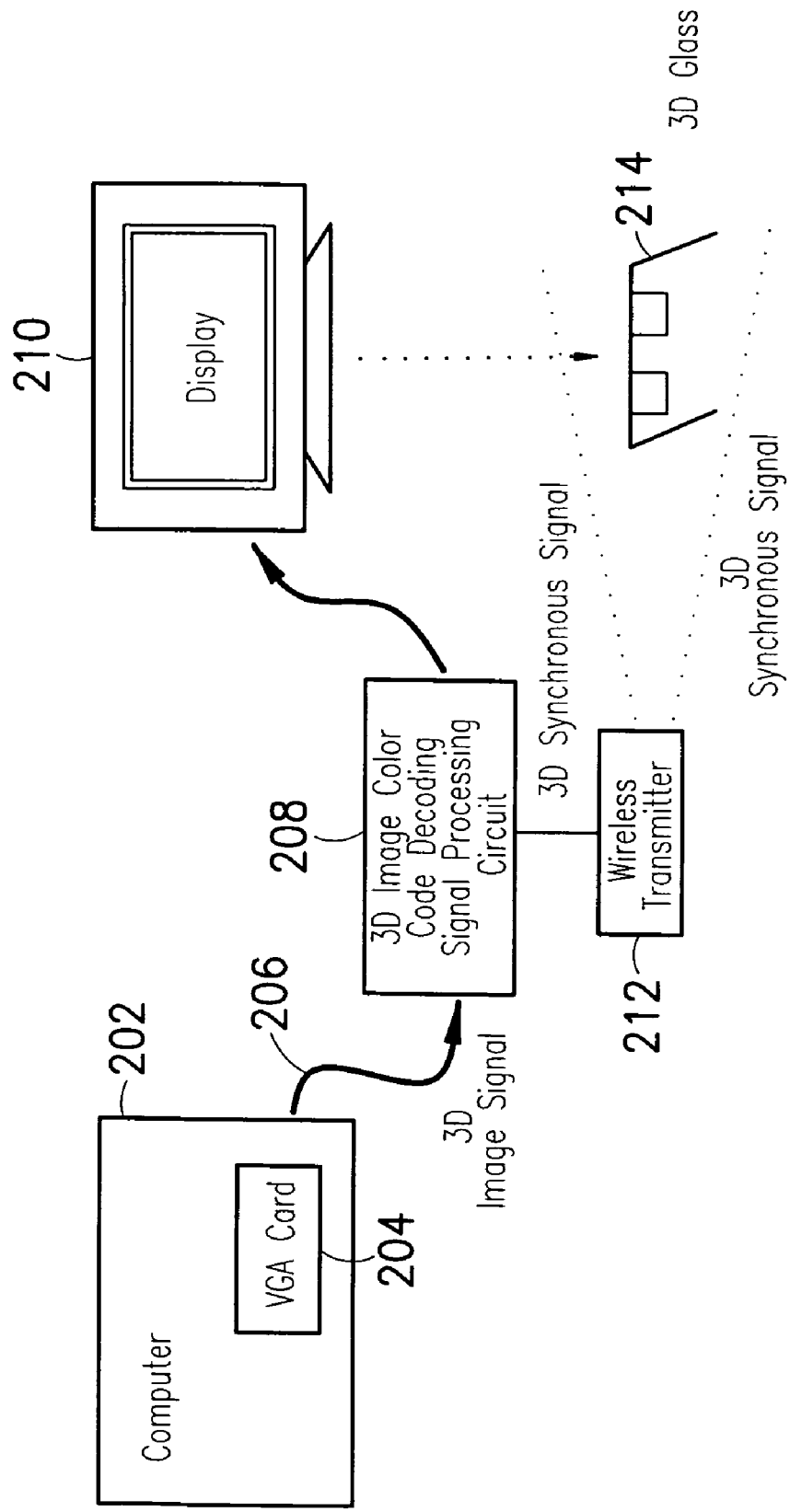
FIG. 2 is a schematic drawing of a conventional 3D video system.
Figure 3:
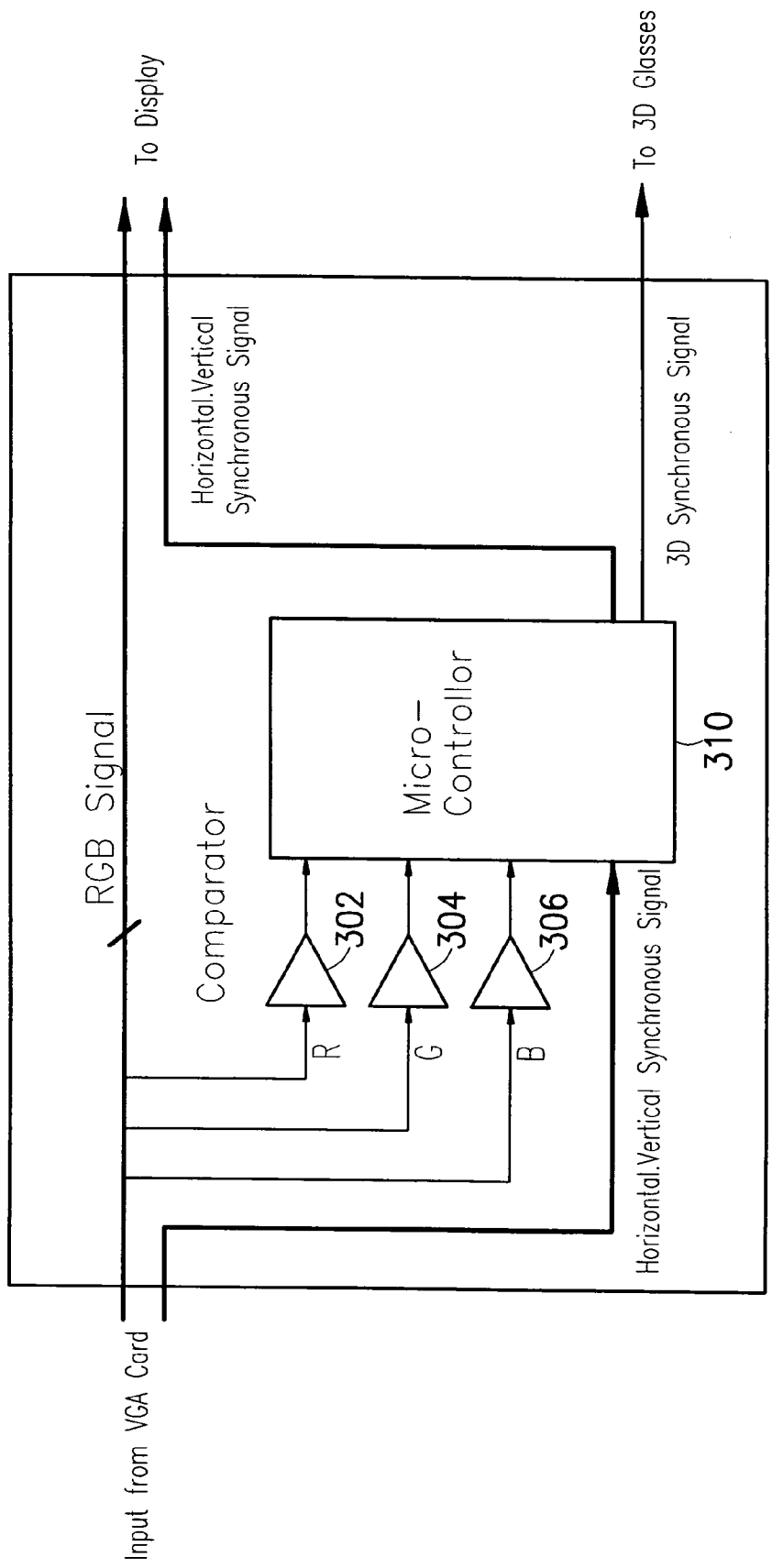
FIG. 3 is a block diagram showing a conventional 3D video color code decoded and signal processing circuit.
Figure 4:
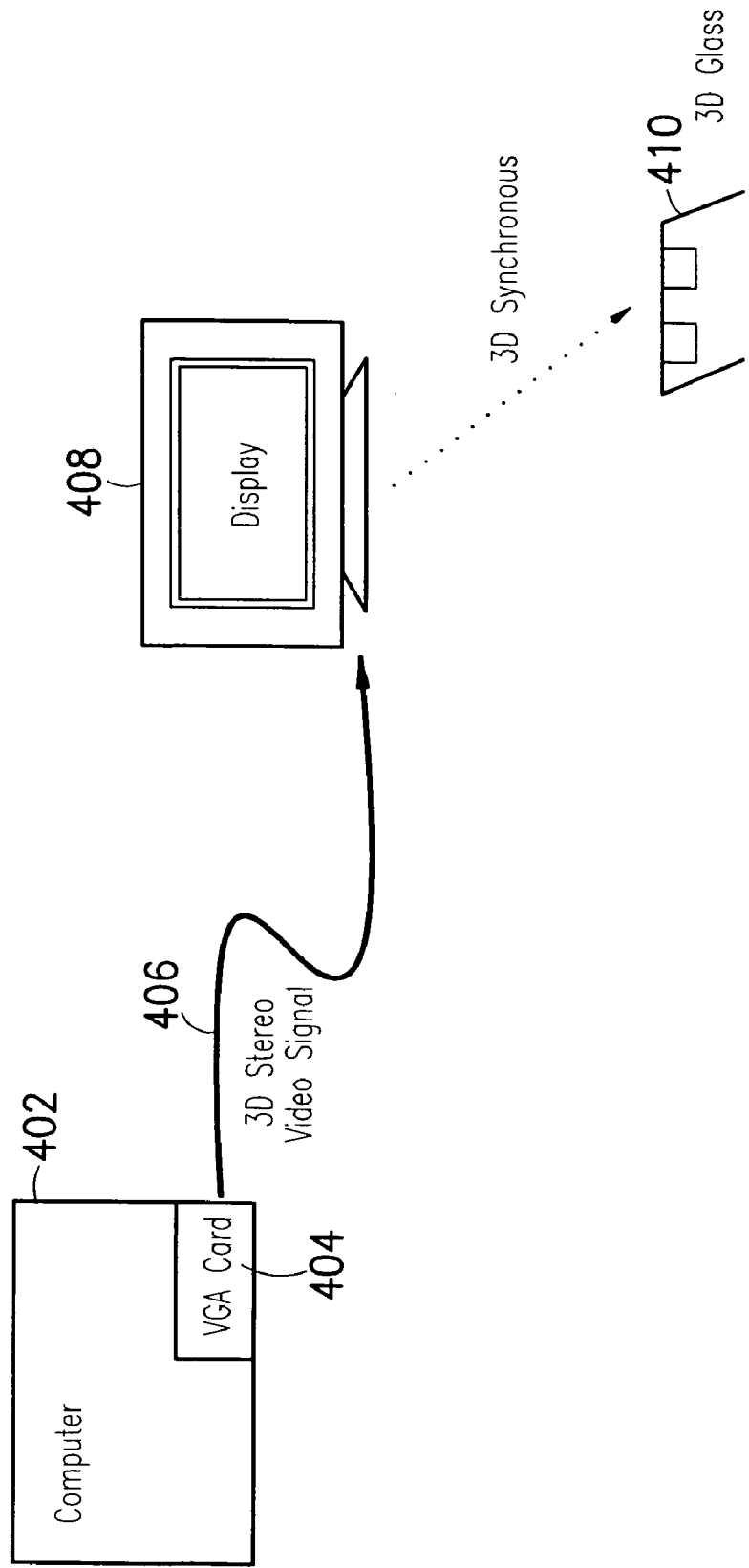
FIG. 4 shows a schematic drawing of a 3D video system according to the invention.

FIG. 4 shows a schematic drawing of a 3D video system. In FIG. 4, a 3D video signal (with color code signal hidden in the video signal) is output from a VGA card 404 of a computer 402 to a display 408 with built-in 3D video color code decoded and image processed circuit via a cable 406. The 3D video color code decoded circuit (not shown) in the display 408 detects the color code of the 3D video signal, and determines the type of the 3D video signal by a signal processed circuit in the display 408 for proper video signal process.

A video signal is obtained from decoding and processing the 3D video signal by the 3D video color code decoded and signal processed circuit of the display 408, which then shows a 3D video picture. The wireless eradiation device built into the display 408 then emits the 3D synchronous signal from the signal processed circuit to the 3D glasses 410. After receiving the 3D synchronous signal output from the wireless eradiation device, the observer can obtain a 3D vision by alternately blocking one eye.

Figure 5:
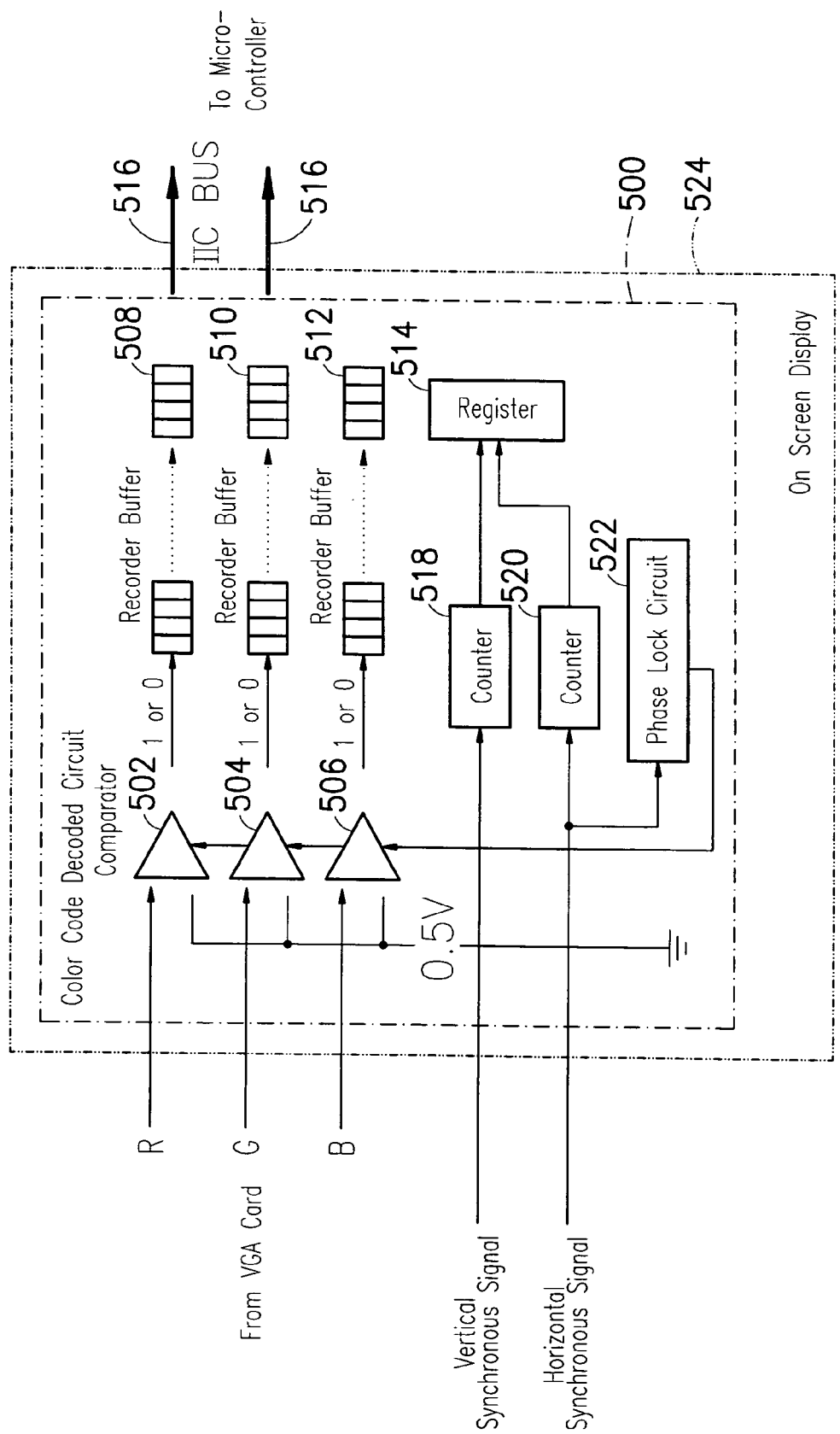
FIG. 5 shows a block diagram of a 3D video color code decoded circuit according to the invention.

A block diagram of a 3D video color code decoded circuit is illustrated in FIG. 5. In FIG. 5, the color code decoded circuit 500 is built into an on-screen display 524 of a circuit in a display. One terminal of a comparator 502 is to receive an R signal of the video signal output from a VGA card, while the other terminal of the comparator 502 is coupled to a reference potential of 0.5V. Since the potential of the video signal from the VGA card is $0.7V_{p-p}$, after receiving the sample signal from a phase lock circuit 522, the comparator 502 outputs a "1" (a high level) signal when the level of the R signal is higher than the level of the reference potential. In contrast, when the level of the R signal of the video signal is lower than the level of the reference potential, the comparator 502 outputs a "0" (a low level) signal. Meanwhile, the result of each comparison ("0" or "1") of the comparator 502 is stored in the record buffer 508. When the readable flag is configured as "1" by the counter 520 (that is, the counter 520 sets the temporary storage of the register 514 as "1"), the micro-controller reads all the data in the record buffer 508 via the bus (such as the IIC BUS 516 in FIG. 5).

Similarly, each of the comparators 504 and 506 of the color code decoded circuit 500 comprises one terminal to receive the G signal and the R signal of the video signal output from the VGA card, respectively, and the other terminal is coupled to a reference potential of 0.5V. After receiving the sample signal output from the phase lock circuit, the comparators 504 and 506 output "1" signals when the levels of the G signal and the R signal are higher than the level of the reference potential. When the levels of the G signal and the R signal are lower than the level of the reference potential, the comparators 504 and 506 output "0" signals. Meanwhile, each comparison result of the comparators 504 and 506 is sequentially stored in the record buffers 510 and 512, respectively. When the readable flag is configured as "1" by the counter 520 (that is, the value temporarily stored by the register 514 is set as "1" by the counter 520), the micro-controller reads all the data stored in the record buffers 510 and 512 via the IIC BUS 516.

In FIG. 5, the register 514 temporarily stores the value of the readable flag. A value of the readable flag equal to "0" indicates that the color code decoded circuit 500 is decoding a 3D video signal. When the value of the readable flag is "1", the color code decoded circuit is finishing decoding the 3D video signal. The counter 518 counts the number of the vertical synchronous signals of the 3D video signal. Whenever the counter 518 is counting the vertical synchronous signal, the readable flag is configured as "0" by the counter 518. The counter 520 counts the number of the horizontal synchronous signals. When the number of the horizontal synchronous signals reaches 64 (the embodiment uses a horizontal synchronous signal with 64 lines as an example), the counter 520 sets the readable flag to "1". The phase lock circuit 522 built into the on-screen display 524 receives the horizontal synchronous signals. The frequency generated by the phase lock loop circuit 522 is a multiple of the frequency of the horizontal synchronous signal. The R signal, the G signal and the B signal of the horizontal synchronous signals are sampled at the middle thereof. Therefore, when the counting frequency of the phase lock loop circuit 522 is at the middle of each signal, the frequency is the sampling signal provided to the comparators 502, 504 and 506.

Figure 6:
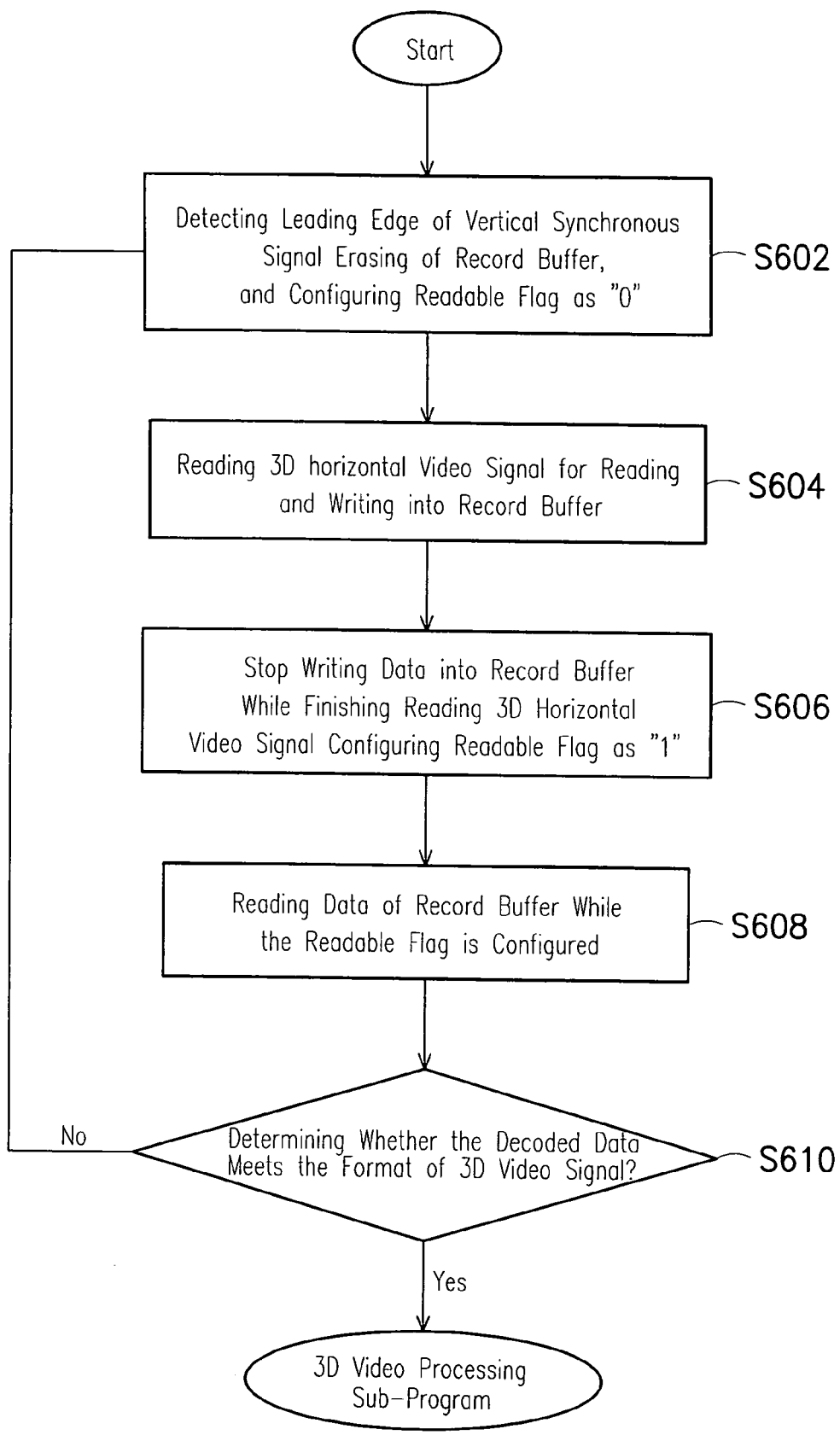
FIG. 6 shows a flow chart of a method for decoding a 3D video color code according to the invention.
Figure 7:
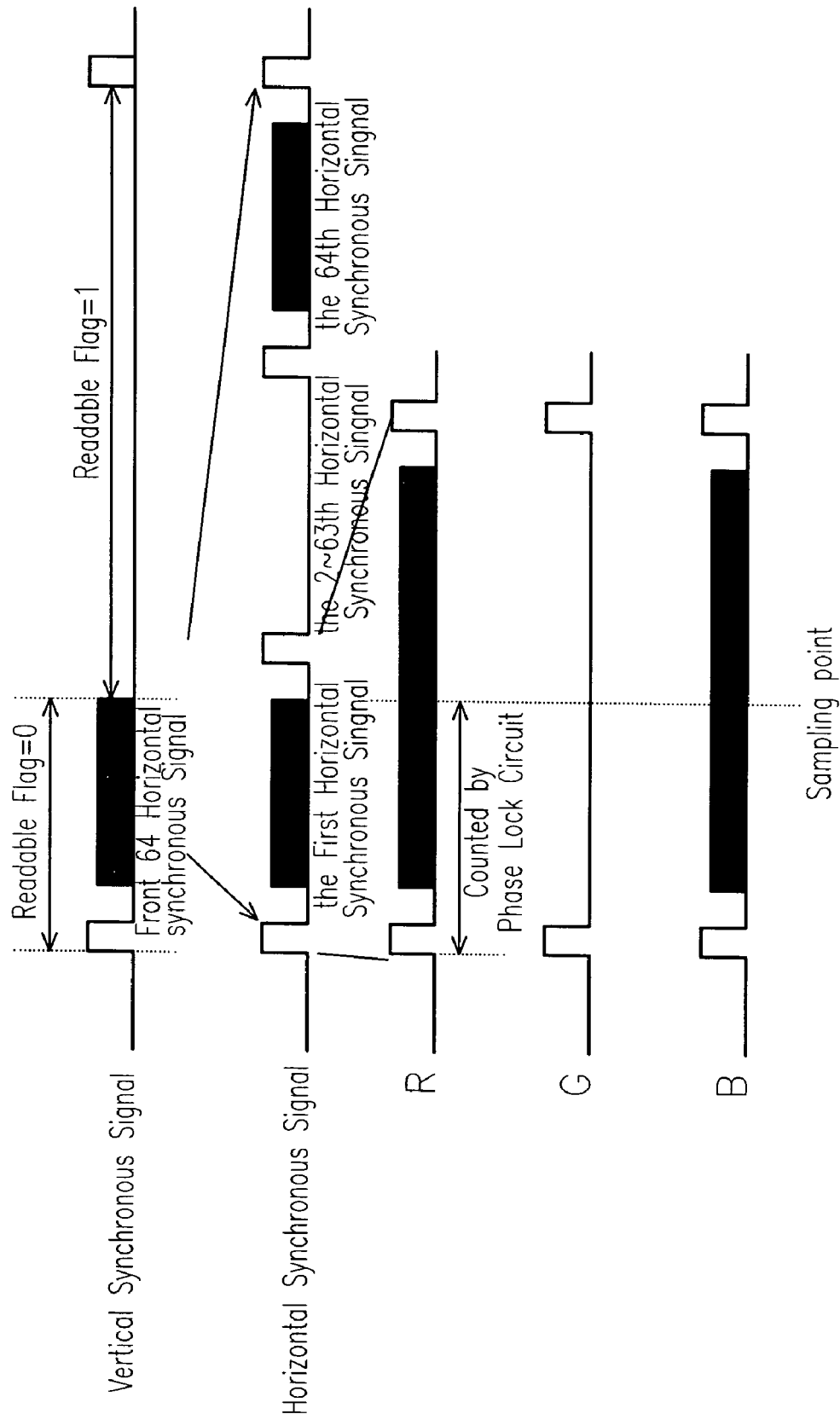
FIG. 7 shows a schematic drawing of a 3D color code according to the invention.

FIG. 6 shows a flow chart of the 3D image decoding method of the invention. Referring to both the block diagram in FIG. 5 and the flow chart in FIG. 6, a video signal output from the VGA card includes vertical synchronous signals, while the vertical synchronous signals further comprise horizontal synchronous signals. FIG. 7 shows a schematic drawing of the 3D color code of the invention. The 64 lines of the horizontal synchronous signal are located in the front of the vertical synchronous signal. Each line of the horizontal synchronous of the 3D video signal further comprises the R, G and B signals in front.

The vertical synchronous signal of the 3D video signal output from the VGA card counted by the counter 518 can be treated as the leading edge for detecting the vertical synchronous signal. When the counter detects the leading edge of the vertical synchronous signal, the color code decoded circuit 500 erases the contents of the record buffers 508, 510 and 512. The readable flag of the counter 518 is configured as "0" (that is, the value of the register 514 is configured as "0" by the counter 518) (S602).

Since the readable flag is "0", the first horizontal synchronous signal is input to the color code decoded circuit 500. The R signal, G signal and B signal of the first synchronous signal are sent to the comparators 502, 504 and 506, respectively. In FIG. 7, after receiving the sampling signals from the phase lock signal, the sampling results of the sampling points in the R, G, B signals of the first horizontal synchronous signal are that the comparator 502 outputs "1", the comparator 504 outputs "0" and the comparator outputs "1", whereas the output results for writing the first bits of the record registers 508, 510 and 512 into the comparators 502, 504 and 506 are "1", "0" and "1", respectively (S604). Similarly, at the sampling points of the R, G, B signals of the 2 to 64 horizontal synchronous signals, the comparators 502, 504 and 506 write the sampling results to the 2 to 64 bits of the record buffers 510, 512 and 514, respectively. Thus, the 64 lines of the R, G, B signals of the horizontal synchronous signals of the 3D video signal can be decoded into a 3D video color data.

After decoding 64 lines of the horizontal synchronous signal of the 3D video image into the 3D video color code data, and after sequentially writing the 3D color code data into the record buffers 510, 512 and 514, the process stops.

Meanwhile, since the counting value of the counter 520 reaches 64, the counter 520 configures the readable flag as "1" (that is, the value of the register 514 is configured as "1") (S606).

The micro-controller of the display then checks the value of the register 514 and whether the readable flag has been configured as "1". When the micro-controller finds out that the readable flag is configured as "1", all the decoded data in the record buffers 508, 510 and 512 are read by the micro-controller via the IIC BUS 516 (S608). Meanwhile, the micro-controller judges whether the decoded data read from the record buffers 508, 510 and 512 meet the format of the 3D video signal (any of Sync, Line Blinking, Page Flipping and Interleave). When the data meet the format of the 3D video signal, a sub-program for processing the 3D video signal is entered to show the 3D video picture on the display. If the decoded data does not meet the format of the 3D video signal, it indicates that the decoded color code data is incorrect, so that the display cannot show the 3D video picture, and the process goes back to step S602.

In the invention, the color code decoded circuit of the 3D display is built into the on-screen display of the display. As a result, the 3D video signal processed signal can achieve the functions via the micro-controller of the display without additional cable and signal processing box (that is, the color code decoded circuit and micro-controller). No additional space is occupied, and the performance of 3D display is enhanced.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A method for decoding a 3D video signal decoded with a color code for a 3D display, the method comprising:
    detecting a leading edge of the vertical synchronous signal of the 3D video signal;
    resetting a readable flag;
    comparing the 3D video signal with a reference signal to obtain a decoded color code value;
    counting a number of times the 3D video signal is read, after the number reaches a predetermined value, configuring the readable flag;
    outputting the decoded color code value when the readable flag has been configured;
    judging whether the color code value meets a 3D video format, wherein
        when the color code value meets the 3D video format, entering a process sub-program; and
        when the color code value does not meet the 3D video format, going back detecting the leading edge of the vertical synchronous signal of the 3D video signal; and
    displaying a 3D video image based on the readable flag.

2. The method according to claim 1, wherein the step of counting the number of times the 3D video signal is read, comprising:
    counting a number of a vertical synchronous signal of the 3D video signal, wherein each time when the counting is performed, the readable flag is reset; and
    counting a number of a horizontal synchronous signal of the 3D video signal, wherein when the number of the horizontal synchronous signal reaches the predetermined value, the readable flag is configured.

* * * * *